Patented Feb. 15, 1949

2,461,949

UNITED STATES PATENT OFFICE 2,461,949

METHOD OF OBTAINING A CRYSTALLINE SODIUM PENICILLIN

Oskar Wintersteiner and Harold B. MacPhillamy, New Brunswick, N. J., assignors to E. R. Squibb & Sons, New York, N. Y., a corporation of New York No Drawing. Application June 13, 1944, Serial No. 540,140

2 Claims. (Cl. 260—302)

This application is a continuation-in-part of our application Serial No. 497,719, filed August 6, 1943, which has become abandoned.

The invention relates to the potent bacteriostatic and/or bactericidal agents formed during the growth processes of various strains of the mold *Penicillium notatum*.

In 1929, Fleming discovered that a strain of a Penicillium mold growing in ordinary nutrient broth formed a powerful antibacterial substance, which he named "penicillin" (Brit. J. Exptl. Path., 10, 226–36); and this name was also used to designate the product obtained by Florey and his associates at the University of Oxford (by the stationary, surface-pad growth of *Penicillium notatum* on shallow layers of synthetic media) and shown by them to be a clinically-useful chemotherapeutic agent (Lancet, 241, 177, 1941).

More recently, it was found advantageous to grow the mold *Penicillium notatum* in submerged culture, i. e., to incubate the mold while it is submerged in a liquid nutrient medium and the latter is aerated, by agitation or otherwise (Foster and McDaniel application, Serial No. 487,140, filed May 15, 1943, now Patent No. 2,448,-790, dated September 7, 1948); and at the time applicants' parent application was filed, this was the process more generally employed (with a medium comprising corn steep liquor) for commercial production, the preparation obtained by this process being then (and even yet) commonly known as "sodium-penicillin," or often merely "penicillin."

It is now realized that more than one chemical entity has been identified by the specific name "penicillin." Thus, the crystalline product described hereinafter, derived from the aforementioned submerged-culture, corn-steep "sodium-penicillin" preparation, has the empirical formula $C_{16}H_{17}O_4N_2SNa$; but the crystalline product derived (as described in the Wintersteiner and Adler application, Serial No. 540,543, filed June 15, 1944) from a "sodium-penicillin" preparation obtained by growing *Penicillium notatum* in submerged culture in a synthetic medium in which has been included sodium sulfite (as described in McCormack application Serial No. 519,207, filed January 21, 1944, now Patent No. 2,437,918, dated March 16, 1948) has the empirical formula $C_{14}H_{19}O_4N_2SNa$. To prevent further confusion, therefore, the submerged-culture, corn-steep "penicillin" has been named—and will hereinafter be referred to as—penicillin G, and the submerged-culture, sodium sulfite "penicillin" has been named penicillin F; and these names have been adopted by the interested chemical research groups in this country.

While the impure sodium-penicillin G commercially produced is an exceptionally effective chemotherapeutic (antibiotic) agent, the therapeutic utility thereof is impaired by its relative instability at room temperature and its hygroscopicity.

It is the object of this invention to provide highly active, stable, nonhygroscopic sodium-penicillin G, and a method of preparing it—especially to provide pure, crystalline sodium-penicillin G, and a method of obtaining it; and a further object is to provide highly-active, substantially-pure, acid-penicillin G and derivatives thereof.

In the practice of this invention, high-potency sodium-penicillin G is purified by dissolving it in an aqueous water-miscible organic solvent of medium polarity, such as aqueous acetone, passing the solution through a chromatographic-adsorption column, and recovering sodium-penicillin G from the yellow zones of the column. From this partially-purified sodium-penicillin G (or comparable sodium-penicillin G otherwise obtained), substantially pure, highly-active, stable, non-hygroscopic, granular or semicrystalline sodium-penicillin G may be obtained by drying, and fractionating the dried product with a dry water-miscible organic solvent of medium polarity, such as acetone; and from the thus-obtained granular or semicrystalline sodium-penicillin G (or comparable sodium-penicillin G otherwise obtained), pure, crystalline sodium-penicillin G may be obtained by crystallization from a suitable solvent.

The water-miscible organic solvents of medium polarity utilizable in the practice of this invention comprise, inter alia, the lower-aliphatic ketones (e. g., acetone, methyl ethyl ketone, and diethyl ketone) and the cyclic ethers (e. g., dioxane), the preferred solvent being acetone. The crystallization of sodium-penicillin G is preferably effected from a solvent essentially comprising a lower-aliphatic alcohol, e. g., methanol, ethanol, n-propanol, isopropanol, and n-butanol. Thus, crystallization may be effected by dissolving the granular or semicrystalline sodium-penicillin G in methanol or ethanol, and adding an excess of organic alcohol-miscible non-solvent for sodium-penicillin G. Preferably, however, a water-containing primary lower-aliphatic alcohol of 3–6 carbon atoms, notably n-butanol, is employed for the crystallization.

The pure, crystalline sodium-penicillin G obtained in accordance with this invention may be used advantageously for the preparation of highly-active, pure, acid-penicillin G and derivatives thereof. Thus, such acid-penicillin G, of the empirical formula $C_{16}H_{18}O_4N_2S \cdot \frac{1}{2}H_2O$, may be obtained by acidifying an aqueous solution of the pure crystalline sodium-penicillin G of this invention with phosphoric acid, extracting the aqueous solution with ether, replacing the ether by benzene, and removal of the latter by vacuum-freeze drying. From this acid-penicillin G, various highly-active, pure derivatives may be obtained, inter alia, esters and other metal salts. For example, a calcium salt may be obtained by dissolving the acid-penicillin G in ether, extracting the ether solution with small portions of aqueous $Ca(OH)_2$ or with an aqueous suspension of $CaCO_3$, and removing the water in vacuo; a water-soluble zinc salt may be analogously obtained by extracting the ether solution with an aqueous suspension of $Zn(OH)_2$; and the esters may be obtained by treating a dry ether solution of the pure acid-penicillin G with a diazoalkane, e. g., diazomethane. In the foregoing procedures, all treatments involving acid solutions (acid-penicillin G) are, of course, carried out at low temperature, e. g., while cooling with ice; and the isolation of the acid-penicillin G in solid form may, of course, be omitted in the preparation of the various derivatives.

The substantially pure, highly-active granular or semi-crystalline sodium-penicillin G described above can be used analogously for the preparation of substantially pure, highly-active free acid-penicillin G and derivatives thereof.

The following examples are illustrative of the invention (the potency unit referred to being the Florey, or Oxford, unit used in the United States of America for standardizing therapeutic "penicillin" preparations):

*Example 1*

(a) 5 g. of sodium-penicillin G having a potency of 560 units/mg. is dissolved in 50 cc. 95% acetone, and the solution is passed through a 4 x 30 cm. column of alumina (which has been washed with dilute sulfuric acid and water until the washings have a pH of 4-5, dried, and heated at 150° C. for 48 hours). The column is then washed with 95% acetone to develop the chromatogram, until it presents the following appearance: a narrow dark-brown band (I) at the top of the column; below this, a light-brown zone (II) extending downward to a position about ⅓ the length of the column from the top; below this, a light-yellow zone (III) extending to a position about ¾ of the length of the column from the top; below this, a light-yellow band; and finally a very faintly yellow zone (IV) extending to the bottom of the column. (The acetone washings contain very little activity and are discarded.) The column is then sucked dry with an air current, cut and the sections treated as follows: band I, which contains only inactive material, is discarded; zone II is eluted with a pH 7 phosphate-buffer solution, yielding material of comparatively low potency; and zones III and IV, which together contain the most potent material, are combined and eluted with a pH 7 phosphate-buffer solution. The eluted penicillin G in this highly active fraction is then reconverted into sodium salt by acidifying the ice-cooled buffer solution with 10% phosphoric acid to pH 2-3, extracting three times with ether, washing the combined ether extracts with water, re-extracting with small portions of 1% aqueous sodium bicarbonate solution until the pH of the last extract is 6.5, freezing the combined aqueous extracts, and subjecting the frozen material to a high vacuum to sublime out the water. The partially purified sodium-penicillin G thus obtained weighs 1.1 g. and has a potency of about 1100 units/mg. (The material of comparatively low potency obtained from zone II may be combined with the same fraction from other batches and rechromatographed.)

The foregoing chromatographic procedure is also applicable to low-potency sodium-penicillin G—say, sodium-penicillin G having a potency of 300-400 units/mg. The resulting partially-purified sodium-penicillin G, though its potency may be no higher than 700-1000 units/mg., is nevertheless suitable for further purification by the following procedure, but the yield of the crystalline product will be substantially lower. If the original potency is still lower, say 200 units/mg., the product must be rechromatographed to obtain a sodium-penicillin G sufficiently purified to be used in the following procedure.

(b) The partially-purified sodium-penicillin G obtained as described in section (a)—or sodium-penicillin G of comparable purity otherwise obtained—is thoroughly dried by placing it in a desiccator over phosphorus pentoxide and maintaining it under vacuum, and treated with a quantity of absolute acetone equal to 40 cc. per g. sodium-penicillin G. (The salt, on contact with the solvent, forms a semi-liquid, orange-colored gum, which seems to dissolve almost completely on stirring; but after 5-10 seconds, a nearly colorless granular mass separates very rapidly, while the pigment stays in solution.) The acetone-insoluble material, after several washings with dry acetone, is a buff-colored powder representing 60-80% of the weight of the partially-purified sodium-penicillin G. The product thus obtained, after drying over $P_2O_5$ in vacuo for 12-16 hours, is a substantially pure (as indicated by an N:S:Na ratio of 2:1:1, and an $[\alpha]_D$ of +270° to +280° in water), stable, nonhygroscopic (remaining absolutely constant in weight when exposed to the atmosphere at room temperature for a long period), highly active, granular or semicrystalline sodium-penicillin G having a potency of about 1300-1400 units/mg. (The acetone-soluble material, in contrast, is so hygroscopic that it becomes semi-liquid in a short time on exposure to the atmosphere.)

If the proportion of absolute acetone to sodium-penicillin G is raised to 100 cc. per g., the precipitation is more gradual but is complete in about 5 minutes.

(c) The substantially-pure, non-hygroscopic sodium-penicillin G obtained as described in section (b)—or sodium-penicillin G of comparable purity otherwise obtained—is dissolved in a small volume of methanol, and about five volumes of ethyl acetate is added. The resulting slightly-yellow crystalline material (rosettes of needles) is separated from the mother liquor by filtering or centrifuging, and recrystallized in the same manner until entirely colorless.

The product, pure crystalline sodium-penicillin G, melts at 222° C. with decomposition, has a specific rotation $[\alpha]_D^{22}$ of +308° ±3° in water, and has the empirical formula $C_{16}H_{17}O_4N_2SNa$, and its potency is 1600 units/mg. The ultraviolet absorption curve of the compound in aqueous solution has the following characteristics; no absorption above 2700A; below this wave-length 3 low maxima at 2630, 2570, and 2520A are in evidence, followed by end absorption to the limit of the measurable range, 2250A. This indicates that the impurities still present in the substantially-pure granular or semicrystalline product obtained in (b) of this example [which impurities are responsible for a low absorption between 3000 Å and 3400 Å ($E_1^{\%}{}_{cm.}=6-8$)] are absent from the crystalline product. On degradation by hydrolysis with boiling 0.1 normal sulfuric acid and subsequent treatment with mercuric chloride, an aldehyde $C_{10}H_{11}O_2N$ can be isolated from the mercuric-chloride, filtrate in the form of a 2,4-dinitrophenylhydrazone, $C_{16}H_{15}O_5N_5$, melting at 195° C. Further degradation has shown—and, synthesis has confirmed—that this aldehyde is phenylacetylaminoacetaldehyde.

The structural formula of sodium-penicillin G is

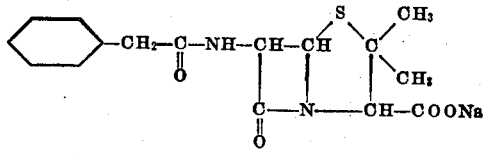

Example 2

5 g. of sodium-penicillin G having a potency of 600 units/mg. is dissolved in 50 cc. 95% acetone, and the solution is passed through a 4 x 30 cm. column of alumina (prepared as described in the foregoing example). The intact column is then washed with 95% acetone to develop the chromatogram, until the yellow zone IV reaches the bottom of the column, and the washings are discarded; then the column is further washed with 95% acetone until the yellow zone III completely leaves the bottom of the column; and partially purified sodium-penicillin G is recovered from this acetone solution by adding one-tenth volume of pH 7 phosphate-buffer solution, removing the acetone by vacuum distillation below 40° C., and treating the resulting aqueous buffer solution as described in section (a) of the foregoing example. The partially-purified sodium-penicillin G thus obtained is then treated as described in section (b) of the foregoing example to obtain a substantially pure, stable, non-hygroscopic, granular or semicrystalline sodium-penicillin G—or, as described in sections (b) and (c) of the foregoing example, to obtain pure crystalline sodium-penicillin G.

Example 3

50 mg. of substantially-pure, stable, non-hygroscopic, sodium-penicillin G, obtained for example as detailed in sections (a) and (b) of Example 1, is dissolved in 5 cc. absolute ethanol, the volume of the solvent is reduced to 1 cc. by subjecting it to a stream of dry $CO_2$, and 4 cc. absolute acetone is added. A granular or semicrystalline material separates; and on standing 12-16 hours in a refrigerator, small crystalline aggregates deposit on the wall of the container. The collected semicrystalline and crystalline material has a potency of about 1875 units/mg. (The mother liquor, on slow partial evaporation, yields a white material containing an additional quantity of the crystalline product.)

Example 4

10.5 g. of substantially-pure, stable, non-hygroscopic, sodium-penicillin G, obtained for example as detailed in sections (a) and (b) of Example 1, is dissolved in the minimum quantity of water necessary for solution (about 4.0 cc.), and n-butanol (about 110 cc.) is added gradually until crystals begin to form. After the solution has stood in the refrigerator for 12-16 hours, the crystalline material is filtered off, washed with fresh n-butanol and dried. 6.9 g. crystalline sodium-penicillin G is thus obtained as perfectly-white long needles having a specific rotation $[\alpha]_D^{22}$ of $+308°$ in water. An additional yield (1.25 g.) of almost colorless crystals can be obtained by evaporating the combined mother liquor and washing in vacuo to a small volume, the combined yield representing 77% of the weight of the starting material. Recrystallization, if desired, is effected in the same manner.

When the starting material contains a relatively large quantity of pigment, the butanol solution, before refrigeration, is filtered through a bed of charcoal for removal of pigment.

The crystallization procedure described in section (c) of Example 1 has the following disadvantages, inter alia, which are not involved in the foregoing crystallization procedure: the first crystallizate always retains some of the pigment still present in the acetone-insoluble material, and 3 or 4 recrystallizations (with consequent loss of material) are required to obtain perfectly colorless crystals; and the recovery of the sodium-penicillin G remaining in the mother liquors is unsatisfactory, presumably because penicillin G undergoes a relatively rapid reaction with methanol, accompanied by inactivation.

Example 5

The procedure of Example 4 is modified to the extent that the sodium-penicillin G is dissolved in a volume of water-saturated n-butanol just sufficient for solution, and the solution is refrigerated and further treated as described in that example. Approximately the same yields are obtained.

Example 6

An ice-cold solution of 150 mg. pure crystalline sodium-penicillin G in 20 cc. of water is acidified to pH 2 with 10% phosphoric acid, and the acid-penicillin G formed is extracted with three 20 cc. portions of ether. The ether extracts are combined, washed with two 10 cc. portions of water, and then extracted with very small portions (less than 1 cc.) of saturated calcium hydroxide solution until the pH of the aqueous extract is 6.5. The aqueous solutions are combined and vacuum-freeze dried, yielding 90 mg. of a white, amorphous powder (calcium-penicillin G) with a potency of 1400 units/mg. In contradistinction to the crystalline sodium salt, the calcium salt is soluble in acetone, chloroform, and ethyl acetate. The analytical composition indicates that it has the formula $(C_{16}H_{17}O_4N_2S)_2Ca$. (Found: C, 52.8; H, 4.95; Ca, 5.91. Calculated: C, 54.4; H, 4.81; Ca, 5.66.)

Example 7

200 mg. pure crystalline sodium-penicillin G is converted into acid-penicillin G as described in Example 6. The ether solution is shaken with small portions of a suspension of zinc hydroxide having a pH of 7.7, until the aqueous layer has a pH of 6.5. This is followed by washing with a small amount of water, the latter showing the same pH of 6.5. The aqueous extracts and the water used for washing are combined and filtered, and the clear filtrate is freed from the solvent by vacuum-freeze drying. The dried product is a white, fluffy, amorphous substance, weighing 190 mg., which is completely soluble in water, the lower alcohols, acetone, ethyl acetate, and chloroform, and has a potency of 1250 units/mg. The analytical composition indicates that it is a mixture of the neutral salt $(C_{16}H_{17}O_4N_2S)_2Zn$, and the basic salt $(C_{16}H_{17}O_4N_2S)ZnOH$.

Example 8

60 mg. pure crystalline sodium-penicillin G is converted into acid-penicillin G as described in Example 6, except that chloroform (free from alcohol) is used for the extraction instead of ether. The chloroform solution is dried over sodium sulfate, filtered, and the acid-penicillin G is precipitated by adding an excess of hexane; and the white, amorphous precipitate is filtered off and washed with hexane. The product (acid-penicillin G) is a non-hygroscopic, white, amorphous powder, sparingly soluble in water, but soluble in most organic solvents except petroleum ether, which has the composition $$C_{16}H_{18}O_4N_2S \cdot \tfrac{1}{2}H_2O$$

(Found: C, 55.75; H, 5.36; N, 8.20. Calculated: C, 55.95; H, 5.58; N, 8.16.) It retains its activity for at least a month when kept in the desiccator over $P_2O_5$.

Example 9

An ice-cold solution of 600 mg. pure crystalline sodium-penicillin G in 25 cc. water is acidified with 10% phosphoric acid to pH 2 and extracted with three 20 cc. portions of ether. The ether extracts are combined, washed once with ice water and dried over sodium sulfate at refrigerator temperature. (The yield of acid-pencillin G, as determined by the evaporation of an aliquot of ether solution, is 512 mg.) To the dry ether solution, one equivalent diazomethane (63 mg.) in 40 cc. dry ether is added; and the reaction mixture is allowed to stand for seven minutes at room temperature, and is then extracted with 10 cc. of ph 7.1 phosphate-buffer solution for the removal of any unreacted acid-penicillin G. The ether solution is dried and concentrated in vacuo to ¼ of its volume; 50 cc. of benzene is added and the remaining ether is removed by vacuum distillation; and the benzene solution is further concentrated to 15 cc. and then vacuum-freeze dried. The residue is a viscous, slightly yellow oil, which crystallizes on scratching with a glass rod in the presence of some hexane. The crystalline material (the methyl ester of acid-penicillin G) is recrystallized from a mixture of ethyl acetate and hexane and then has a melting point of 95–96° and an $[\alpha]_D$ of +175° in choloroform (containing 1% of ethanol) and of +287° in dry methanol. Its analytical composition is $C_{17}H_{20}O_4N_2S$. (Found: C, 58.85; H, 5.61; N, 8.21; OCH₃, 9.03. Calculated: C, 58.60; H, 5.77; N. 8.04; OCH₃, 8.90.) Although the potency in vitro of an aqueous solution prepared by adding an alcohol solution of the ester to a large volume of water is 25 units/mg., the ester is readily hydrolyzed in the animal organism, so that its protective action when administered intraperitoneally or perorally to mice infected with a virulent strain of pneumococcus is approximately equal to that of pure crystalline sodium-penicillin G administered by the same routes.

The invention may be variously otherwise embodied within the scope of the appended claims.

We claim:

1. In the method of obtaining a crystalline sodium-pencillin of the type characterized by the structural formula

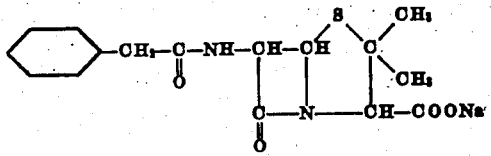

the step of crystallizing an amorphous, high-potency sodium-pencillin of such type from a water-containing primary lower-aliphatic alcohol of 3–6 carbon atoms.

2. In the method of obtaining a crystalline sodium-penicillin of the type characterized by the structural formula

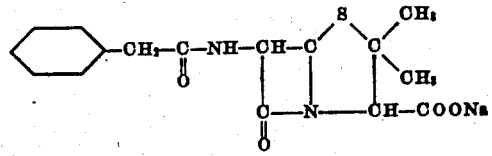

the step of crystallizing an amorphous, high-potency sodium-penicillin of such type from a water-containing n-butanol.

OSKAR WINTERSTEINER.
HAROLD B. MacPHILLAMY.

REFERENCES CITED

The following references are of record in the file of this patent:

UNITED STATES PATENTS

| Number | Name | Date |
|---|---|---|
| 2,399,840 | Wachtel | May 7, 1946 |

OTHER REFERENCES

Manufacturing Chemists and Manufacturing Perfumer, Aug. 1943, XIV, 8, pages 251–254. (Copies in Congressional Library.)

Lancet, Aug. 16, 1941, pages 177–188.

Moyer: "An Improved Method for Production of Penicillin," Dec. 17, 1941, 5 pages—a paper distributed in New York to applicants' assignee.

J. American Medical Assoc., July 7, 1945, p. 736 (cited for applicants' information).

Salivar Separation and Identification of Penicillin Species in Commercial Penicillin (Feb. 1947).

Abraham: British Journal of Experimental Pathology, vol. 23, June 1942, pp. 103–125.

Meyer et al.: "Science," vol. 96, July 3, 1942, page 20.